(No Model.)
H. R. CASSEL.
PROCESS OF EXTRACTING GOLD FROM SUBSTANCES CONTAINING IT.
No. 568,741. Patented Oct. 6, 1896.
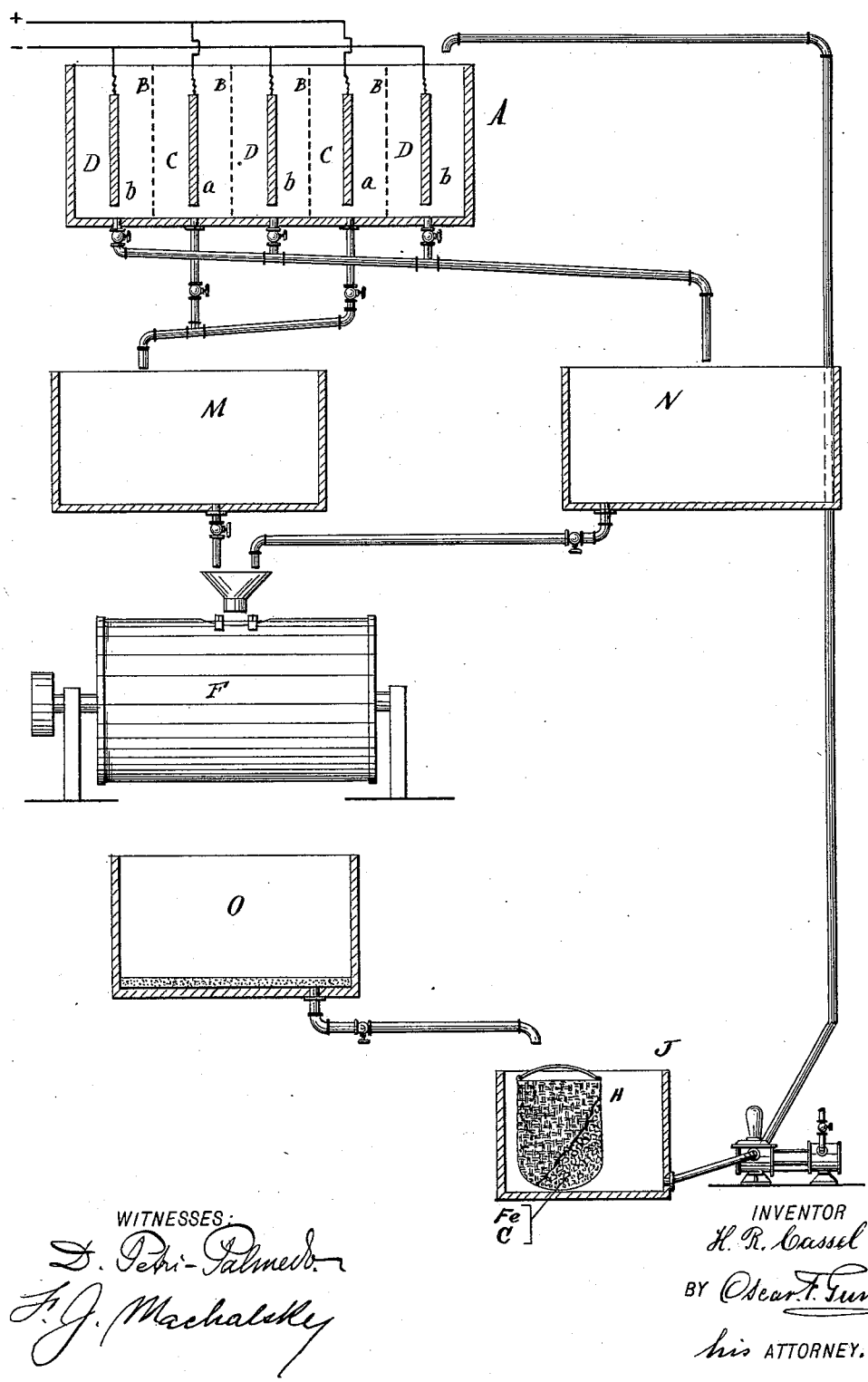

UNITED STATES PATENT OFFICE.

HENRY R. CASSEL, OF NEW YORK, N. Y.

PROCESS OF EXTRACTING GOLD FROM SUBSTANCES CONTAINING IT.

SPECIFICATION forming part of Letters Patent No. 568,741, dated October 6, 1896.

Application filed February 9, 1895. Serial No. 537,770. (No specimens.)

*To all whom it may concern:*

Be it known that I, HENRY R. CASSEL, a citizen of the United States, and a resident of the city of New York, in the county of New York and State of New York, have invented certain new and useful Improvements in Processes of Extracting Gold from Substances Containing it, of which the following is a specification.

The object of this invention is to provide a new and improved process of extracting gold from its ores and other auriferous compounds by means of bromin solutions and to regenerate such bromin solution.

An aqueous bromin solution dissolves finely-divided gold, but I have found that an oxybromide solution, such as is obtained by the electrolysis of bromide of potassium, for instance, is a more powerful and efficient solvent for gold, and its use has the advantage not only of shortening the time required for extracting the gold, but also of preventing the loss of bromin.

In the accompanying drawing, forming a part of this specification, a diagram vertical sectional view of an apparatus which I use in carrying out my improved process is shown.

A solution of bromide of potassium or a bromide of any other suitable alkali is electrolyzed in a decomposing-tank A, containing anodes $a$ and cathodes $b$, of carbon or any other suitable material not affected injuriously by the solution.

Between each anode and each cathode a diaphragm B, preferably of asbestos cloth, is placed, whereby anode compartments C and cathode compartments D are formed.

The electrolytic decomposition causes the bromin to gradually accumulate in the anode compartments C, while the potassium hydrate accumulates in the cathode compartments D. At the same time, however, water is being decomposed, the oxygen of which is set free at the anodes $a$, and there forms, with the bromin, an oxygenated or an oxybromide solution.

When the solution in the anode compartments C is sufficiently charged with bromin, which can readily be ascertained by its red color, it is withdrawn through the taps into the tank M and is then ready for use for treating the ores or other auriferous compounds.

The potassium hydrate in the cathode compartments D is also withdrawn into a tank N, and is used for leaching the tailings, as will be hereinafter set forth.

The ore, in pulverized condition, together with the bromin solution, is placed into a rotating cylinder F and therein thoroughly mixed for about two hours, more or less, and until all the gold has been dissolved.

The mixture of ore and solution is dumped into a filtering-tank O and the solution filtered from the ore.

Most of the dissolved gold is contained in the filtered solution, but there is still some gold and some bromin left in the tailings, and these could be leached out by means of water, but I prefer to use for this purpose the potash solution obtained in the cathode compartments D, to which water may be added, if desired.

The potash combines with the bromin and also with the bromide of gold and both are leached out. The reaction is as follows:

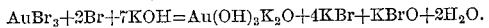
$AuBr_3 + 2Br + 7KOH = Au(OH)_3K_2O + 4KBr + KBrO + 2H_2O$.

This last solution is then added to the first-filtered solution, and both are well mixed, whereby the solution obtained becomes neutral or slightly alkaline.

Instead of filtering the solution from the ore and then adding an alkali thereto, the alkaline solution may be added to the ore as soon as the gold has been dissolved by the bromin and before filtration.

To precipitate the bromide of gold from a bromide solution, it is best to run the bromide solution through scraps of iron and pieces of carbon, which, through galvanic action, causes the gold to be rapidly precipitated. The pieces of iron and the pieces of carbon are to be placed in alternate layers or otherwise into a basket or crate H, adapted to be placed into a tank J.

The gold is precipitated in a finely-divided state on the iron and carbon and can be separated therefrom by washing and shaking the crate, whereby the gold is settled upon the bottom of the tank J, from which it is removed and melted.

The bromide solution, from which the gold has been precipitated, is now again subjected to electrolysis and decomposed, as previously described.

Instead of precipitating the gold upon iron and carbon, it may be precipitated upon the cathodes $b$ during electrolysis; but as this decomposition requires several hours I prefer to precipitate in the manner previously described.

A slight loss of bromin, which may possibly occur, is made good whenever necessary by an addition of free bromin to the solution, either during or before electrolysis.

Having thus described my invention, what I claim as new, and desire to secure by Letters Patent, is—

1. The process of extracting gold from ores which consists in electrolyzing a bromide salt of an alkaline base in solution to separate the bromin from the alkali, maintaining the bromin compounds set free at the anode separate from the alkali during electrolysis, treating the ore with the bromin products to dissolve the gold, adding the alkali to recombine with the compounds of bromin and gold, precipitating the gold, and reconveying the resulting bromide salt to be reëlectrolyzed in a continuous process, substantially as described.

2. The process of extracting gold from substances containing it, which consists in generating by electrolysis, an oxygenated bromin solution, subjecting the substance containing the gold to the action of said solution, adding an alkali, and running the solution through a mixture of pieces of iron and pieces of carbon, to precipitate the gold, substantially as set forth.

3. The process of extracting gold from substances containing it, which consists in subjecting the substance containing the gold to the action of a bromin solution, adding an alkali, and running the solution through a mixture of pieces of iron and pieces of carbon, substantially as herein set forth.

4. The process of extracting gold from substances containing it, which consists in dissolving the gold by a bromin solution, adding an alkali, filtering the solution precipitating the gold and separating the bromin and alkali, from each other by electrolysis, substantially as herein set forth.

5. The process of extracting gold from ores which consists in decomposing a bromide of an alkaline base by electrolysis, dissolving the gold by the anode solution, adding the cathode solution, running the product through a mixture of iron and carbon to precipitate the gold, and redecomposing the liberated bromin solution by electrolysis, substantially as specified.

In testimony that I claim the foregoing as my invention I have signed my name, in presence of two witnesses, this 4th day of February, 1895.

HENRY R. CASSEL.

Witnesses:
OSCAR F. GUNZ,
F. J. MACLEALSLEY.